(12) United States Patent
Sabadie et al.

(10) Patent No.: US 8,915,468 B2
(45) Date of Patent: Dec. 23, 2014

(54) INTERIOR COVERING DEVICE FOR AN AIRCRAFT CABIN INCORPORATING AT LEAST ONE SYSTEM

(75) Inventors: Lionel Sabadie, Toulouse (FR); Laurent Bertandeau, Tournefeuille (FR); Thomas Bernabe, Blagnac (FR); Christian Banis, Leguevin (FR); Marc Tomasi, Toulouse (FR)

(73) Assignee: AIRBUS Operations S.A.S., Toulouse (FR)

( * ) Notice: Subject to any disclaimer, the term of this patent is extended or adjusted under 35 U.S.C. 154(b) by 606 days.

(21) Appl. No.: 13/181,074

(22) Filed: Jul. 12, 2011

(65) Prior Publication Data
US 2012/0012218 A1 Jan. 19, 2012

(30) Foreign Application Priority Data
Jul. 13, 2010 (FR) ..................... 10 02940

(51) Int. Cl.
*B64C 1/00* (2006.01)
*B64C 1/06* (2006.01)
*H02G 3/32* (2006.01)
*B64C 1/40* (2006.01)
*B64D 11/00* (2006.01)

(52) U.S. Cl.
CPC ......... *B64C 1/066* (2013.01); *B64D 2011/0046* (2013.01); *H02G 3/32* (2013.01); *B64C 1/406* (2013.01)
USPC ...................................... 244/119; 244/117 R

(58) Field of Classification Search
CPC .............. B64C 1/06; B64C 1/066; B64C 1/12
USPC ..................... 244/117 R, 118.5, 119; 248/65; 52/220.1; 454/76; 138/106
See application file for complete search history.

(56) References Cited

U.S. PATENT DOCUMENTS

| 5,953,871 | A | * | 9/1999 | MacConnell et al. | ....... 52/220.1 |
| 6,079,170 | A | * | 6/2000 | Slebos | ......... 52/220.1 |
| 2005/0044712 | A1 | | 3/2005 | Gideon et al. | |
| 2005/0082431 | A1 | | 4/2005 | Scown et al. | |
| 2010/0240290 | A1 | | 9/2010 | Markwart et al. | |

FOREIGN PATENT DOCUMENTS

| DE | 10 2007 049 926 A1 | | 4/2009 | |
| EP | 1 510 454 A1 | * | 3/2005 | ............... B64C 1/12 |
| JP | 5-156742 | * | 6/1993 | ................ 52/220.1 |
| JP | 6-49995 | * | 2/1994 | ................ 52/220.1 |

OTHER PUBLICATIONS

U.S. Appl. No. 13/180,903, filed Jul. 12, 2011, Sabadie, et al.
French Preliminary Search Report issued Mar. 15, 2011, in French Application No. 1002940, filed Jul. 13, 2010 (with English Translation of Category of Cited Documents).

* cited by examiner

*Primary Examiner* — Rob Swiatek
(74) *Attorney, Agent, or Firm* — Oblon, Spivak, McClelland, Maier & Neustadt, L.L.P.

(57) ABSTRACT

A device for interior covering of an aircraft cabin, intended to be fastened to a structure of an aircraft and to extend along a skin of the aircraft, the device comprising a covering panel. The covering panel bears at least one system, possibly through a system support. It advantageously comprises at least one air circulation pipe fastened to an exterior face of the covering panel, each air pipe having an upstream end equipped with a connection device.

11 Claims, 9 Drawing Sheets

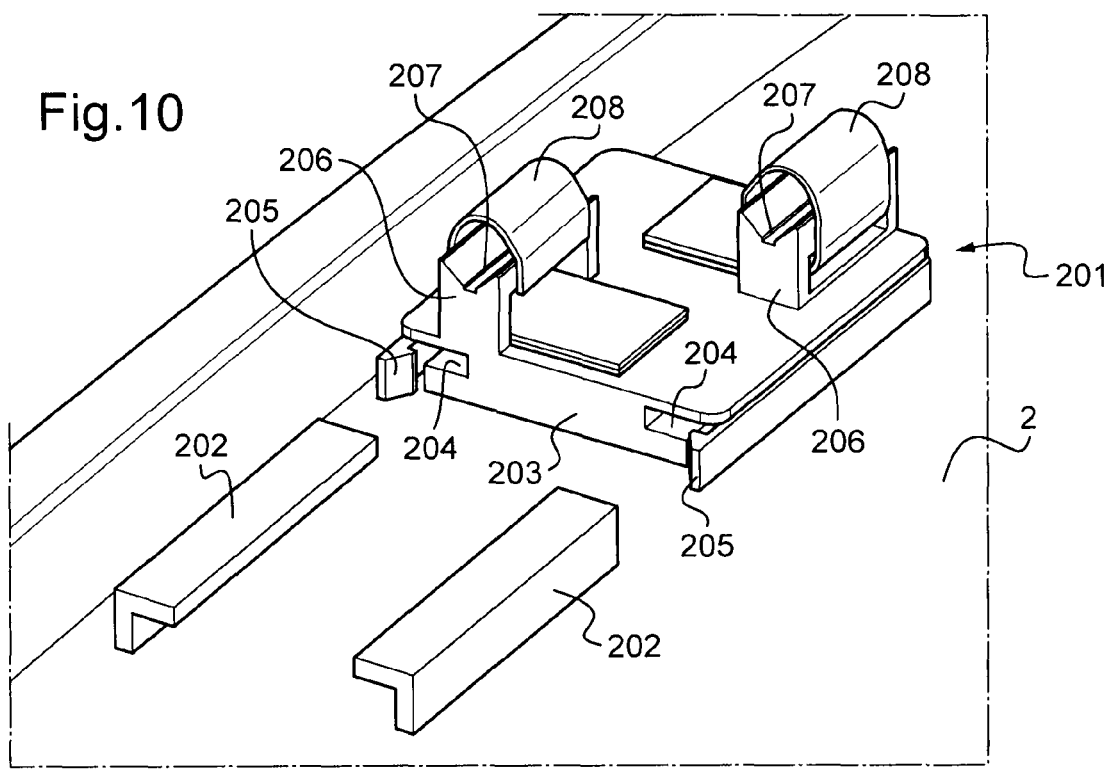
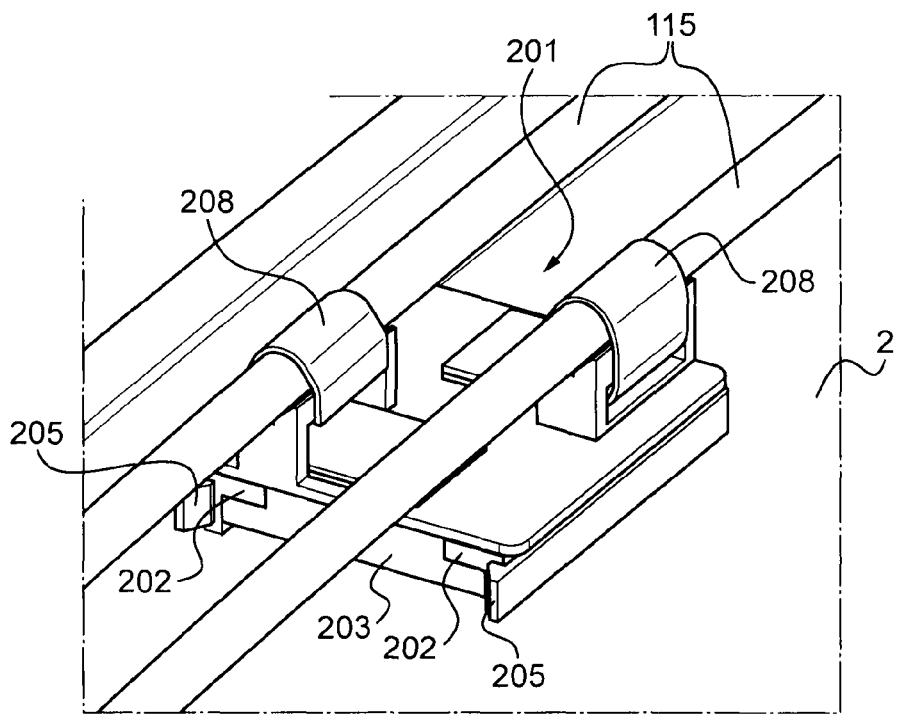

INTERIOR COVERING DEVICE FOR AN AIRCRAFT CABIN INCORPORATING AT LEAST ONE SYSTEM

BACKGROUND

This invention relates to a device for interior covering of an aircraft cabin.

The structure of the fuselage of an aircraft usually is made up of frames extending in transverse planes, stringers extending more or less along a longitudinal direction of the aircraft outside the frames, and a skin that covers the said stringers and is fastened thereto. The skin also is fastened to the frames, through connecting pieces known under the name of "clip."

In the cabin in particular, the interior faces of the fuselage are covered successively by insulation blankets, producing a thermal and sound insulation of the cabin, and by covering panels the interior face of which remains visible from the cabin and thus forms a finish face. Between two successive frames of the fuselage, the skin of the said fuselage is covered by insulation blankets called skin blankets. Each frame of the fuselage is further covered by a blanket called frame blanket. An overlap zone may be provided between consecutive frame and skin blankets.

Between the insulation blankets and the covering panels, systems are arranged: equipment items, electric wirings, hydraulic and pneumatic systems . . . .

DESCRIPTION OF THE RELATED ART

These systems usually are fastened to the structure of the fuselage by localized fastening devices traversing the insulation blankets covering the said structure. Thus, for example, the electric wirings are fastened to the frames of the fuselage with the aid of localized fastening devices comprising a rod which traverses the frame and the blanket (or blankets) which cover it, washers for locking the rod on both sides of the frame, and a lug into which there engages a quick-clamping collar receiving one or more wirings. As regards the pipes provided for the circulation of conditioned air, they usually are fastened to the stringers, with the aid of localized fastening devices comprising a clamping collar borne by a support fastened to a stringer by screws; these screws traverse the skin blanket covering the stringer.

For fastening of the systems, it therefore is necessary to make holes in the structure of the fuselage as well as in the insulation blankets.

The holes made in the structure weaken the latter and therefore make it necessary to provide thickened zones or other structural reinforcements close to them. These holes therefore complicate the design of the fuselage.

Holes made in the insulation blankets degrade the insulation performances of the latter, creating as many thermal and acoustic bridges. They also reduce their watertightness (as it happens, the insulation blankets also have the function of draining, to the trough bottom of the fuselage, the water of condensation appearing on the skin of the latter). Moreover, the making of these holes considerably complicates the manufacture of the blankets and weights down the cost prices thereof. In fact, at each hole made in a blanket comprising a layer of glass wool, the said layer must be replaced by a foam rubber disk, which facilitates making of the hole and reinforces the blanket around the said hole so as to prevent the blanket from tearing.

Moreover, in the event of belated modification (when the aircraft is in assembly phase for example) of the structure of the fuselage or of a system, it is necessary to make one or more additional holes in the blanket concerned and/or in the structural element concerned.

The making of an additional hole in a blanket is a particularly long and tedious process. To this end, it is advisable, in fact, to bond an adhesive strip on each face of the blanket at the location of the hole, cut out a disk in the blanket at the location of the hole with the aid of a first specific cutting tool, remove the blanket disk cut out in this manner and replace it with a foam rubber disk, again bond an adhesive strip on each face of the blanket so as to cover and hold the foam rubber disk, pierce the blanket in the center of the foam rubber disk with the aid of a second specific cutting tool so as to form the hole. When an additional hole is made in a blanket, it furthermore is necessary to fill up the henceforth unused hole in the blanket.

The belated making of holes in a structural element also poses a problem. These holes weaken the structure and, because they are not provided for during design of the fuselage, often make it necessary to add structural reinforcements. Moreover, when the structure is of a composite material, the making of a hole requires the use of a specific tool, generates chips that are harmful—and therefore hazardous for the operator in charge of making the hole—and may cause delaminations of the composite material around the hole. These problems are more difficult to control when making of the hole is not provided for at the outset, and is not done at the manufacturing site of the structure.

For all the reasons indicated above, it is desirable to limit the number of holes made in the structure and in the blankets for fastening the systems.

BRIEF SUMMARY

The invention has as an objective to reduce the number of holes to be made, for purposes of fastening the systems, in the structure of the fuselage of an aircraft and in the insulation blankets that cover this structure. The invention also makes it possible to avoid having to make additional holes in the structure of the fuselage or in the insulation blankets in the event of belated modification of this structure or of certain systems.

To accomplish this, the invention proposes a device for interior covering of an aircraft cabin, intended to be fastened to a structure of an aircraft and to extend along a skin of the aircraft, for example between a ceiling and a floor of the aircraft, the said device comprising a covering panel. The interior covering device according to the invention is characterized in that the covering panel bears at least one system.

This invention thus proposes coming to fasten systems, or at least some of them, onto a covering panel borne by the structure and no longer directly onto the structure. Therefore, fastening of the systems borne by the covering panel does not come to impact the structure of the aircraft. It is not necessary to provide for modifications in the structure of the aircraft, or in the insulation blankets, for the fastening and holding in place of these systems. The invention therefore makes it possible to eliminate the holes previously made in the stringers and in the insulation blankets for fastening the systems.

According to a first embodiment, a device according to this invention comprises at least one support for receiving a system.

This invention is particularly advantageous for the installation of air pipes which are bulky systems and therefore more difficult to accommodate and fasten onto the structure of the aircraft. This invention then proposes a covering device that comprises at least one air circulation pipe, referred to as air pipe, fastened to an exterior face of the covering panel, each air pipe having an end, referred to as upstream end, equipped with a connection device.

In this way, the invention then provides an interior covering device which integrates both a covering panel and one or more air pipes fastened to the said panel. As indicated above, the air pipes no longer are fastened to the structure of the fuselage but are borne by the covering panels which line the cabin.

The invention also proposes a method for installing a covering panel and at least one air circulation pipe (referred to as air pipe) between two frames of an aircraft, characterized in that:
- an interior covering device such as defined above is used, integrating both a covering panel and at least one system such as an air pipe and/or an electric cable,
- the said interior covering device is positioned between two frames of the aircraft and the said device is fastened to the said frames,
- the upstream end of each system is connected to a supply system of the aircraft.

In the prior art, the installation of one or more systems and a covering panel between two frames of an aircraft is carried out in two phases: a first phase for fastening the systems to the structure of the aircraft, and a second phase for fastening the covering panel to the frames. Moreover, fastening the systems, in particular the air pipes onto the stringers according to the prior art, is a delicate operation requiring the intervention of a skilled operator: the operator must feel his way around the stringer (covered by a skin blanket) onto which he is to fasten the air pipe; then, with the greatest care, he must make holes through the skin blanket and the said stringer for anchoring the fastening device making it possible to attach the pipe. Conversely, in the method according to the invention, fastening of the systems onto the covering panel during manufacture of the interior covering device is a simple and speedy operation, which does not give rise to any particular problem and may be performed in standardized and possibly automated manner, upstream from the site at which the covering panels are installed in the aircraft. The invention therefore also translates into a significant productivity gain.

An interior covering device according to the invention preferably is adapted for covering a fuselage zone defined by three consecutive frames. In other words, the invention relates to a method for installing a covering panel and at least one system between two frames which are not necessarily consecutive. When it is adapted for extending in front of several fuselage sections (each section being defined by two consecutive frames), the device according to the invention advantageously integrates one air pipe per fuselage section.

Advantageously, each air pipe has another end, referred to as downstream end, opening onto an air outlet traversing the covering panel. Each air outlet preferably is arranged in the upper part of the covering panel, and the downstream end therefore is an upper end of the air pipe.

In one possible embodiment of the invention, this air outlet is integrated into the covering panel; it forms the downstream end of the air pipe, this end preferably being flared.

In another possible embodiment of the invention, each air outlet is formed by a nozzle, and the downstream end of each air pipe is connected to the corresponding nozzle by a connection device preferably comprising an elastomer sleeve held tightly around the air pipe and the nozzle respectively by two clamping collars.

Advantageously, the upstream end of each pipe extends projecting from a lower edge of the covering panel. This upstream end is intended to be connected to a conditioned-air supply duct, preferably arranged beneath a floor of the aircraft.

Each air pipe preferably is fastened to the exterior face of the covering panel at at least two fastening points, preferably at at least three fastening points, still more preferably at only three points.

Advantageously, each air pipe is provided with a securing lug that engages in a support, referred to as axial locking support, fastened to the exterior face of the covering panel, the said securing lug and the said axial locking support being adapted for cooperating so as to preclude any movement of the air pipe along an axial direction of the said pipe relative to the covering panel. Consequently, the securing lug and the axial locking support prevent any movement of the air pipe in a plane that is more or less vertical when the interior covering device is installed in an aircraft, the air pipe then extending in such a plane over most of its length.

The said securing lug and the said axial locking support advantageously define an upper fastening point.

In one possible embodiment, the securing lug has a C-shaped section in a transverse plane of the air pipe and comprises a core having two opposite lateral offshoots extending along the axial direction of the said pipe. Furthermore, the axial locking support comprises two facing lateral grooves receiving the said offshoots.

Advantageously, for each air pipe, at least one other support, referred to as lateral holding support, is fastened to the exterior face of the covering panel, each lateral holding support comprising a semicircular face for receiving an air pipe and a clamping collar surrounding the said air pipe. This support or these supports ensure a holding of the air pipe along a transverse direction of the pipe, which direction preferably is more or less horizontal when the interior covering device is installed in an aircraft.

Two lateral holding supports, defining respectively a central fastening point and a lower fastening point, preferably are provided for each air pipe.

An embodiment variant of this invention provides that the device according to the invention comprises at least one air circulation pipe, referred to as air pipe, fastened to an exterior face of the covering panel so as to form only a single piece with the said covering panel. It may involve, for example, a piece made of molded synthetic material.

In this invention, it also is provided for the covering panel possibly to bear at least one cable support and at least one electric cable installed in the said supports. These electric cables may be installed in addition to the air pipe (or pipes) or in place thereof. This invention extends to an aircraft comprising interior covering devices according to the invention. Such an aircraft comprises, for example in standard manner, frames and a skin; skin blankets cover the skin between two frames; frame blankets cover the frames. In such an aircraft, it advantageously may be provided for the covering device such as described above to comprise fastening means allowing fastening of the said device onto fastening supports each fastened onto a frame and holding, at least locally, the corresponding frame blanket on the said frame. This embodiment is advantageous because the fastening supports then also are used for holding the frame blankets.

This invention also extends to an interior covering device defined in combination by all or part of the characteristics described above and below.

BRIEF DESCRIPTION OF THE DRAWINGS

Other details and advantages of this invention will become apparent on reading of the following description, which refers to the attached schematic drawings and relates to preferred embodiments, provided by way of non-limitative examples. On these drawings:

FIG. 10 is a view in perspective of a dual cable support before its installation on an interior covering, FIG. 11 shows the dual cable support of FIG. 10 in installed position and supporting two cables.

DETAILED DESCRIPTION

Figure 1:
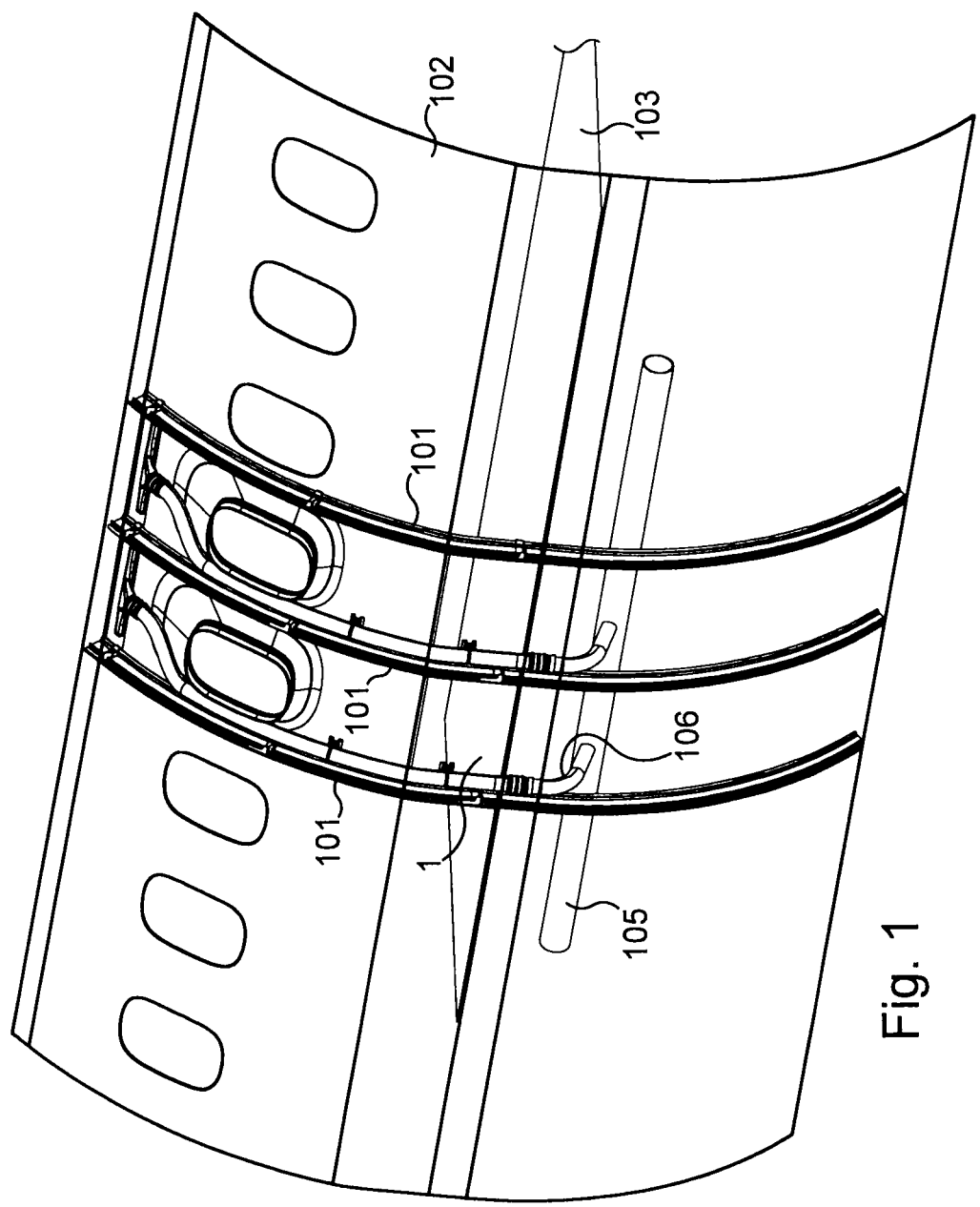
FIG. 1 is a schematic view in perspective of a portion of the fuselage of an aircraft, a part of the skin of this fuselage being made transparent so as to reveal an interior covering device according to the invention.

There may be seen on FIG. 1 a portion of a fuselage of an aircraft, seen from the exterior of the aircraft. Such a fuselage comprises frames 101 extending transversely, stringers (not shown) extending along the longitudinal direction of the fuselage outside frames 101, a skin 102 formed outside the stringers and fastened directly thereto, and a floor 103. Skin 102 also is fastened to frames 101 by connecting pieces 104 visible in FIG. 8, known under the name of clips. In FIG. 1, there are seen in particular, showing through skin 102, three frames 101 defining two fuselage sections.

The cabin of the aircraft is defined by a fuselage portion extending between floor 103 and a ceiling (not shown). This fuselage portion is covered (inside) successively by insulation blankets (not shown in FIG. 1) and interior covering devices 1 according to the invention.

Figure 2:
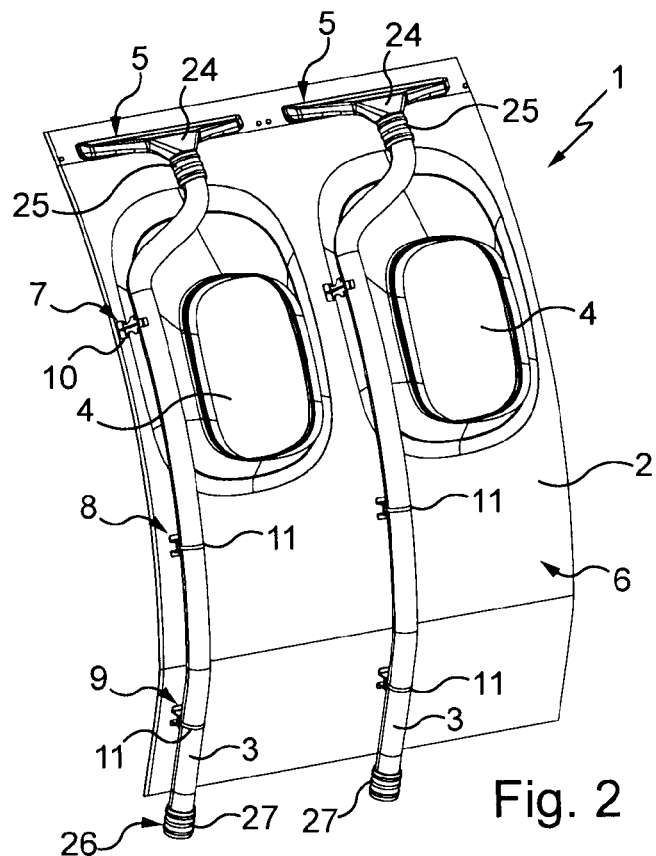
FIG. 2 is a view in perspective of the interior covering device visible in FIG. 1, the said device being seen from an exterior face of its covering panel.
Figure 3:
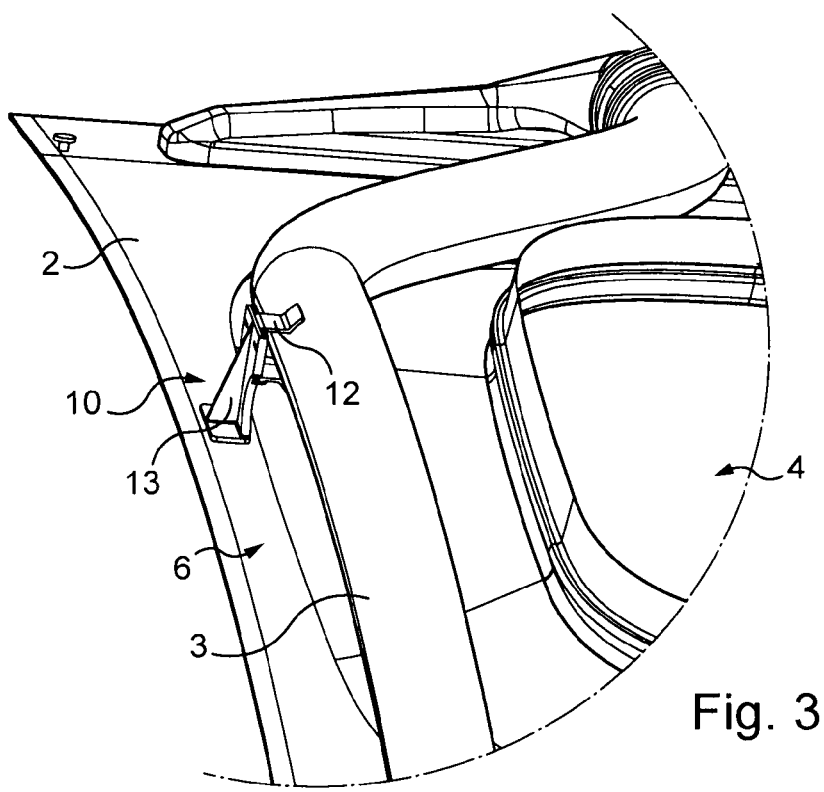
FIG. 3 is a view in perspective of a part of the interior covering device illustrated in FIG. 2, FIGS. 4a and 4b are views in perspective of an axial locking support.
Figures 4A, 4B:
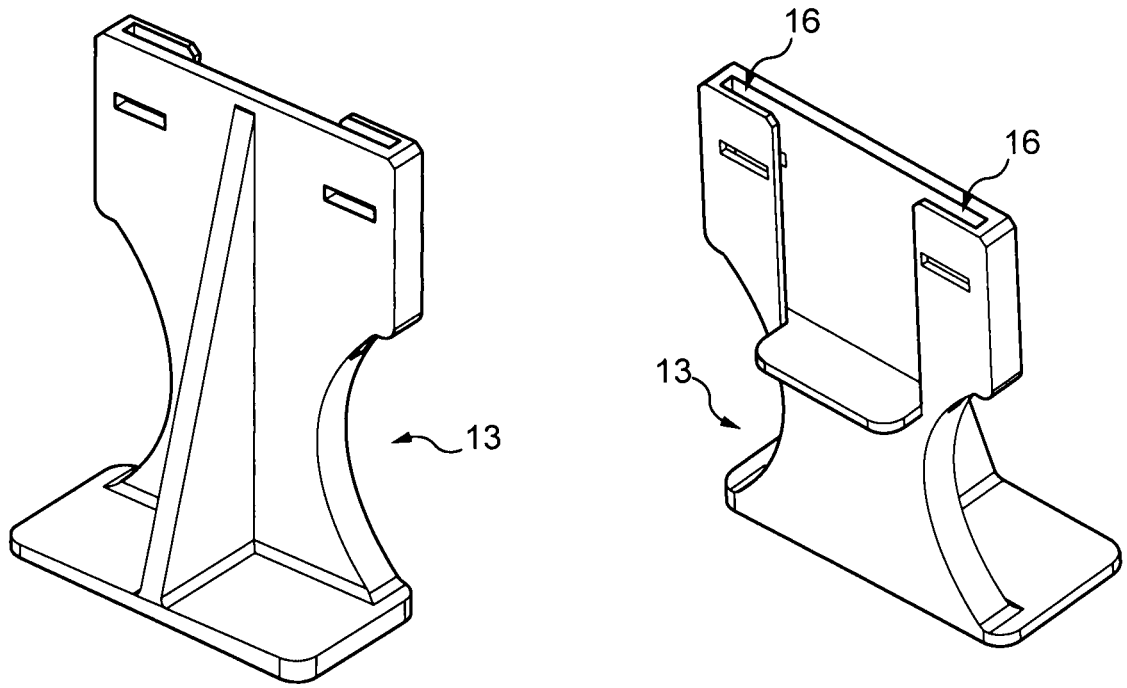
Figure 5:
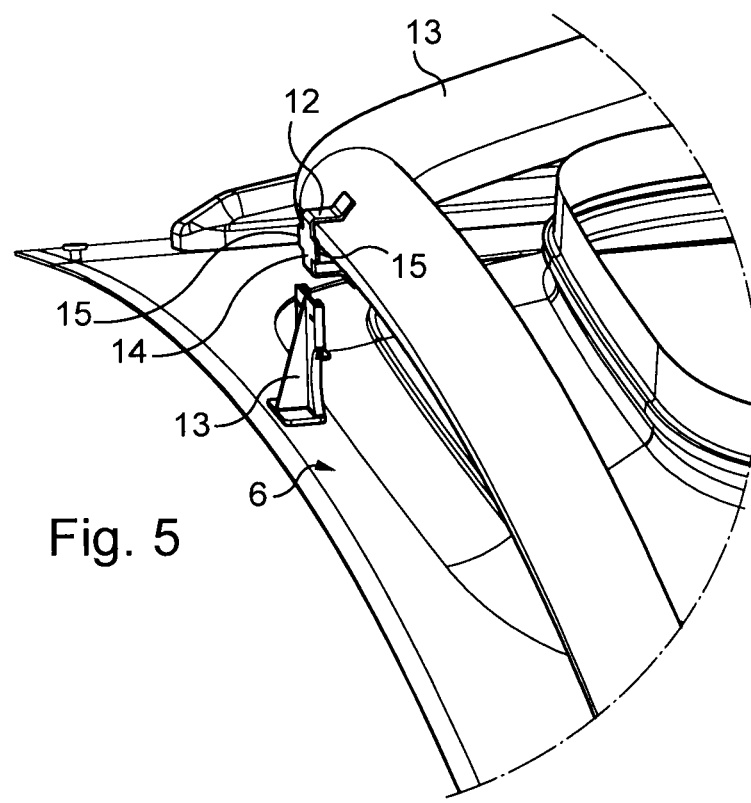
FIG. 5 is a view in perspective of a part of the interior covering device illustrated in FIG. 2, in which the air pipe is detached from the covering panel.

Interior covering device 1 illustrated in FIGS. 1 and 2 comprises a rigid covering panel 2 and two air pipes 3 borne by covering panel 2. Each air pipe 3 is fastened to an exterior face 6 of covering panel 2. The terms "exterior face" here designate the convex face of the panel which, when the device is installed in an aircraft, is turned toward the exterior of the aircraft and extends facing skin 102 of the latter.

In the illustrated example, covering panel 2 is intended to extend between floor 103 and the ceiling of the cabin and to cover two fuselage sections (one section being defined by two consecutive frames 101). It therefore comprises two apertures 4 intended to receive two windows, as well as two oblong conditioned-air outlet openings 5 at the upper part of the covering panel. These openings 5 extend more or less along the longitudinal direction of the aircraft when the device according to the invention is installed in an aircraft.

Each opening 5 defines, with a nozzle 24 widening toward exterior face 6 of the covering panel, an air outlet making it possible to deliver conditioned air into the cabin of the aircraft. The upper end, referred to as downstream end, of each of the two air pipes 3 is connected to one of the two nozzles 24 with the aid of a connection device 25 of the type known under the name of quick-disconnect coupling. Such a quick-disconnect coupling 25 comprises, for example, a sleeve and an O-ring made of elastomer, which O-ring is inserted into an internal groove of the sleeve arranged in a median plane thereof. The O-ring allows a slight misalignment of the ends of the air pipes and of the nozzle. The sleeve initially is fitted around the lower end of nozzle 24. An internal shoulder arranged near the upper edge of the sleeve then comes to be inserted into a complementary external groove arranged in the nozzle in order to lock the sleeve. In this locking position, the O-ring borne by the sleeve is pressed against the end of the nozzle. The downstream end of air pipe 3 then is inserted into the sleeve. Quick-disconnect coupling 25 furthermore comprises two clamping collars, one clamping the sleeve around the end of the nozzle, the other clamping the sleeve around the end of the air pipe.

Each air pipe 3 is fastened to exterior face 6 of the panel at three fastening points 7, 8, 9.

Figure 17:
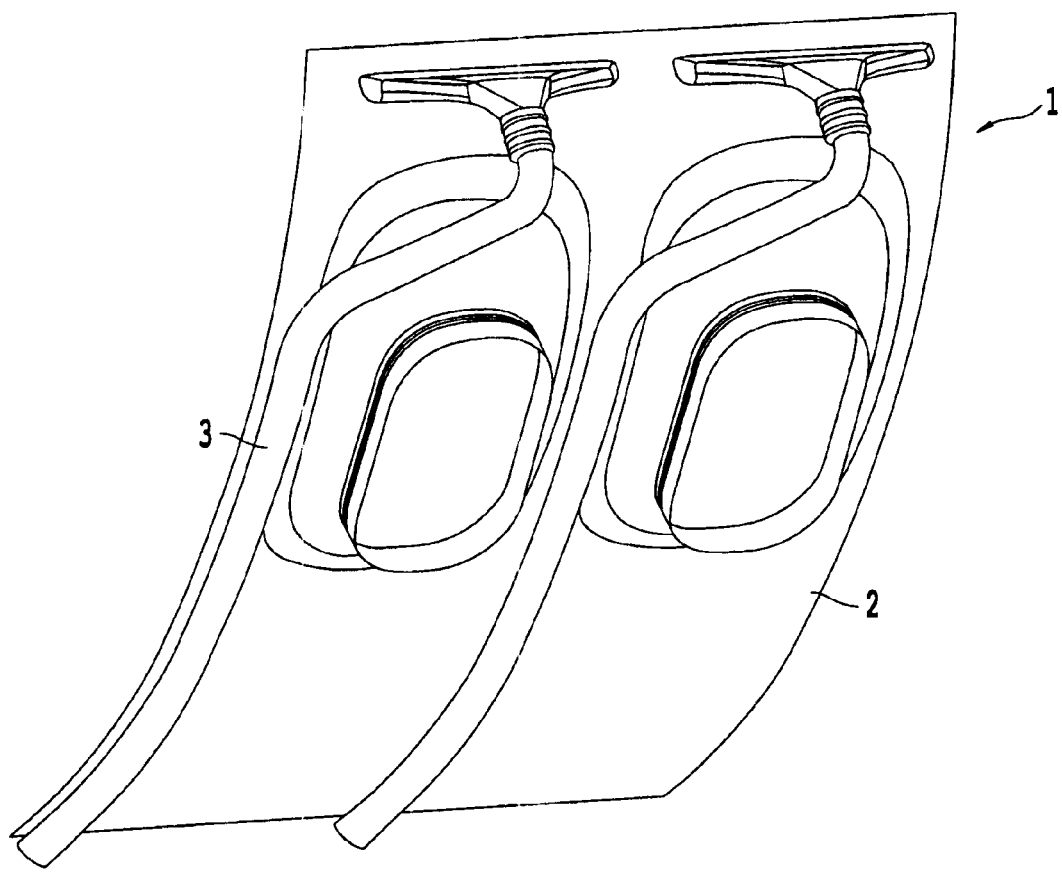
FIG. 17 shows an embodiment variant of a covering device in accordance herewith.

In the embodiment variant of FIG. 17, the same references are used for similar elements. On this Figure there is a covering device comprising a rigid covering panel 2 and two air pipes 3 borne by covering panel 2. The originality of the embodiment here lies in that fact that the air pipes 3 do form only a single piece with covering panel 2. Here it may involve a piece produced by molding a synthetic material.

The device shown in FIG. 17 also may receive other systems, for example electric cables, as explained farther on in this description.

FIGS. 3, 4a, 4b and 5 illustrate fastening means 10 provided at upper fastening point 7. These fastening means 10 comprise:

a securing lug 12, fastened to air pipe 3; this securing lug has a section of overall C shape in a plane orthogonal to an axial direction of air pipe 3, the ends of the branches of the C being extended by two edges allowing bonding of securing lug 12 to air pipe 3; core 14 of the C has two opposite lateral offshoots 15, which extend more or less along the axial direction of the air pipe;

a support 13, referred to as axial locking support, fastened, for example by bonding, to exterior face 6 of covering panel 2; this axial locking support 13 comprises two lateral grooves 16 facing one another along the axial direction of air pipe 3; these grooves 16, which form a slider, receive offshoots 15 of securing lug 12.

When securing lug 12 is engaged into axial locking support 13, the air pipe is locked along its axial direction relative to covering panel 2. The invention extends to any other fastening means making it possible to interlock air pipe 3 with covering panel 2 and preclude any movement of the said pipe along its axial direction: another form of slider connection, for example with dovetail joint, between a lug bonded to the pipe and a support bonded to the covering panel, mortise and tenon connection between such a lug and such a support, etc.

Figure 6:
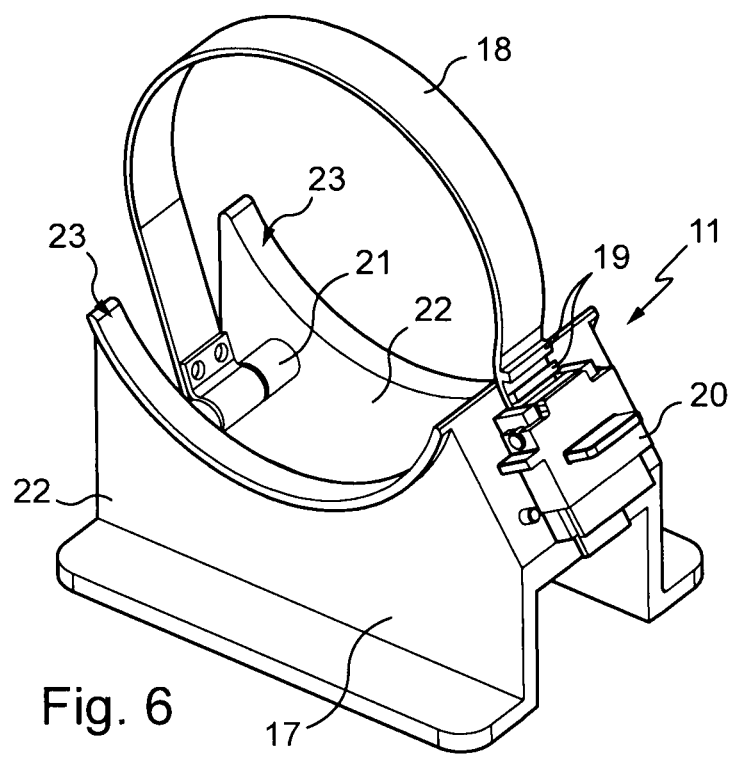
FIG. 6 is a view in perspective of a lateral locking support.

FIG. 6 illustrates fastening means 11, referred to as lateral holding support, provided at central fastening point 8 and at lower fastening point 9. This lateral holding support 11 comprises a base 17 and a collar 18. Base 17 is fastened, for example by bonding, to exterior face 6 of covering panel 2. This base 17 has two clevises 22, whose edges 23 opposite exterior face 6 form a cylindrical surface with semicircular section receiving air pipe 3. A pivot 21, extending between two clevises 22 on one side of base 17, makes it possible to interlock one end of collar 18 with base 17. The other end of collar 18, provided with a succession of ribs 19, is engaged in a casing 20 arranged on the other side of the base. The upper face of the said base can slide between an unlocking position, in which the end of the collar can be moved inside casing 20, and a locking position, in which the end of the collar is gripped. In this way the collar is locked after having been tightened around air pipe 3. Such a lateral holding support 11 precludes any movement of air pipe 3 relative to covering panel 2 along any direction, referred to as transverse direction, orthogonal to the axial direction of the pipe. The invention extends to any other fastening means making it possible to interlock air pipe 3 with covering panel 2 and preclude any movement of the said pipe along transverse directions.

Under no circumstances is the invention limited to the manner in which air pipe 3 is fastened to covering panel 2. As a variant, rigid fastening points also may be provided.

Lower end 26, referred to as upstream end, of each air pipe 3 is equipped with a connection device 27 of the quick-disconnect type. Like the quick-disconnect coupling 25 described above, this quick-disconnect coupling 27 comprises a sleeve, an O-ring and two clamping collars. The sleeve initially is borne by upstream end 26 of air pipe 3. This upstream end is intended to be connected to a conditioned-air supply duct, shunted from a supply circuit 105 arranged beneath floor 103 of the aircraft (see FIG. 1). Preferably, the end of duct 106 that faces the upstream end of air pipe 3 is provided with a conical end-fitting allowing correction of any possible misalignment of duct 106 and air pipe 3. This conical end-fitting comes to engage in the sleeve borne by upstream end 26 of air pipe 3. The two clamping collars make it possible to hold the sleeve firmly around, respectively, upstream end 26 of the air pipe and the conical end-fitting of conditioned-air supply duct 106.

Also proposed here is a method for installation of a covering panel and one or more air pipes in an aircraft. Preliminary to this method, an interior covering device 1 such as the one illustrated in FIG. 2 is produced, intended, for example, to cover two fuselage sections. To this end, two air pipes 3 are fastened to exterior face 6 of covering panel 2, with the aid of fastening means 10 and 11, and the downstream end of each air pipe 3 is connected to corresponding nozzle 24.

Figure 7:
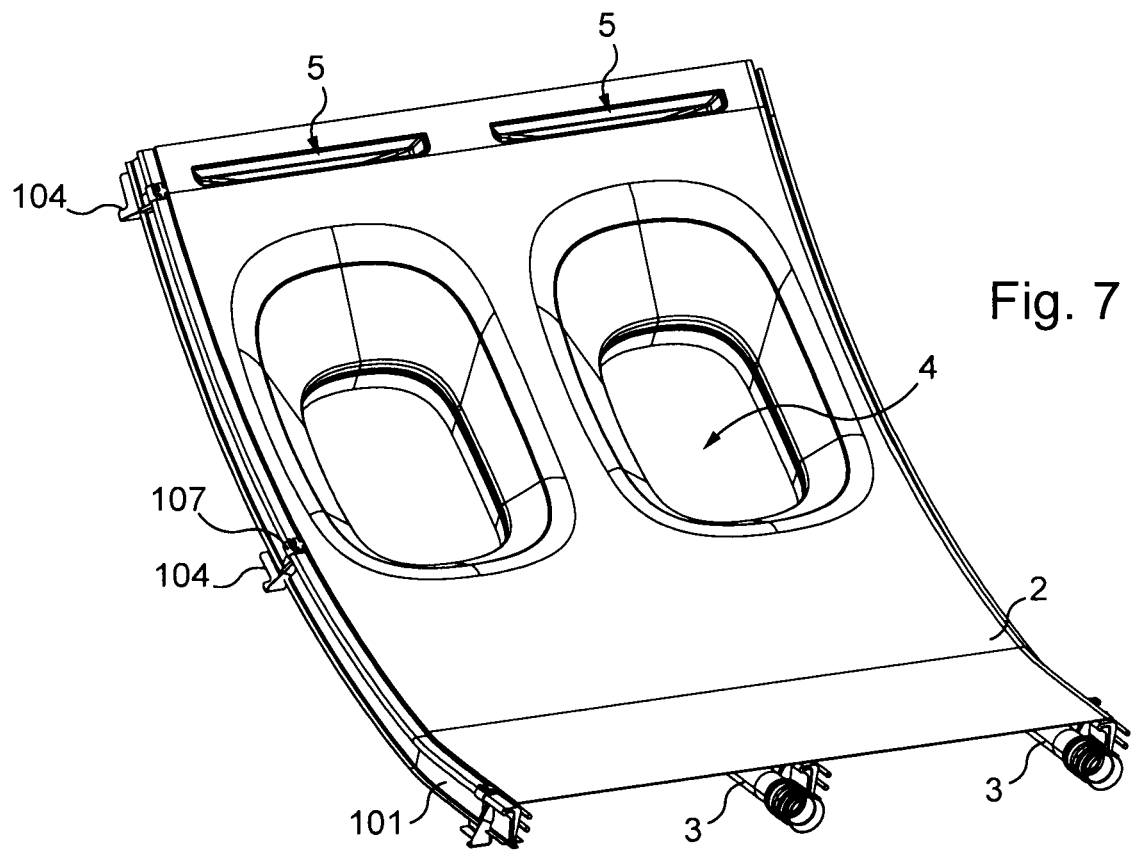
FIG. 7 is a view in perspective of the interior covering device illustrated in FIG. 2, the device being seen from an interior face of its covering panel.

To install interior covering device 1 in the aircraft (see in particular FIG. 7):

a plurality of fastening supports 107 is arranged on at least two frames 101 intended to receive interior covering device 1. In the illustrated example, interior covering device 1 is sized so as to cover two fuselage sections; it therefore is intended to extend facing three frames, partially covering two of the said frames, referred to as end frames, and completely covering the third, referred to as intermediate frame; preferably, three fastening supports 107 are arranged on each of the three frames; it is possible, however, to provide more fastening supports or to provide only two of them per frame; it also is possible to equip only two of the three frames, for example the end frames, with fastening support;

interior covering device 1 is positioned facing the two fuselage sections that the device is to cover, that is to say facing frames 101 intended to receive it, in other words between the two end frames;

interior covering device 1 is fastened to fastening supports 107 arranged on frames 101; in this way, interior covering device 1 is fastened to the said frames through fastening supports 107;

upstream end 26 of each air pipe 3 is connected to corresponding conditioned-air supply duct 106, with the aid of quick-disconnect coupling 27 installed beforehand on said upstream end 26.

Figure 8:
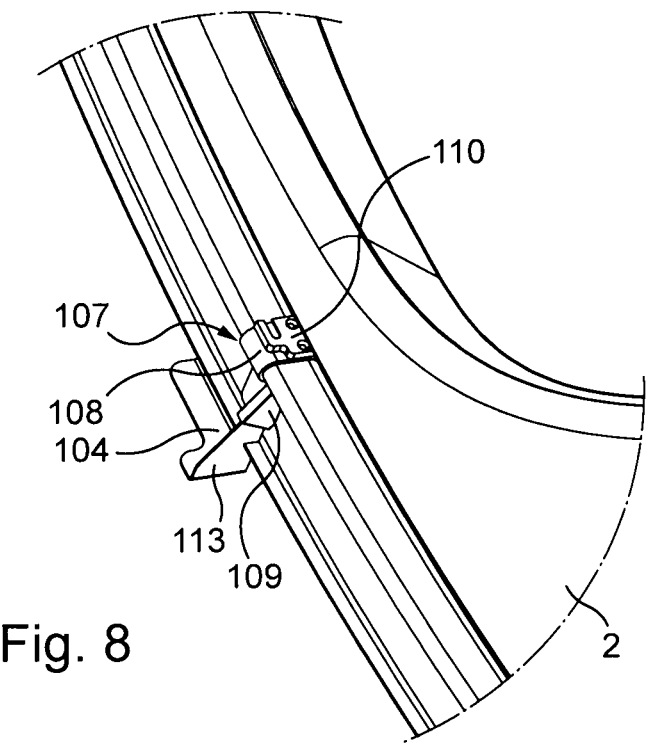
FIG. 8 is a view in perspective of a fastening support making it possible to fasten an interior covering device according to the invention to a frame of the aircraft, the said fastening support being seen from a first side of the said frame.
Figure 9:
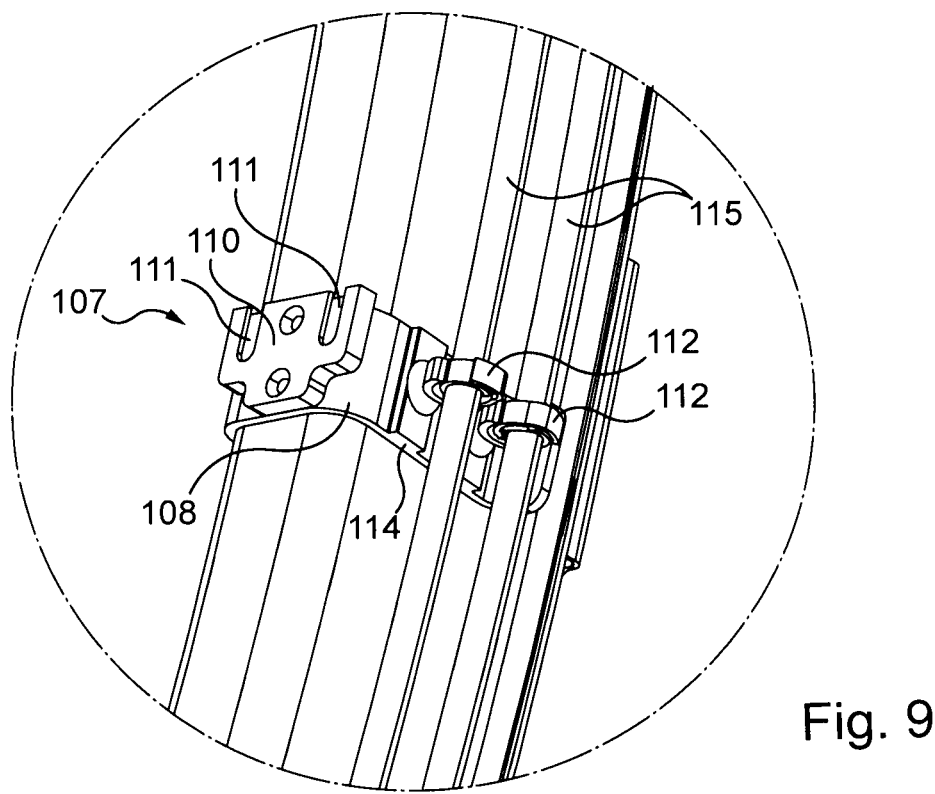
FIG. 9 is a view in perspective of the fastening support illustrated in FIG. 8, the said fastening support being seen from the second side of the frame.

Fastening supports 107 used for fastening interior covering device 1 can be of the type of the one illustrated in FIGS. 8 and 9. Such a fastening support 107 advantageously comprises a first portion forming a grip 108 adapted for coming to top and grip a frame 101 covered by a frame blanket. This grip 108 comprises in particular two opposite branches extending on both sides of the frame, which branches are pressed against the core of the said frame (covered by the frame blanket) by virtue of the elasticity of the grip. Fastening support 107 further comprises a second portion forming a positioning fork 109 adapted for coming to overlap a reinforcement rib 113 of a clip 104, which rib 113 is known under the name of stabilizer. The said positioning fork extends from one, the first, of the branches of grip 108. This positioning fork 109 makes it possible to position and hold in place fastening support 107 relative to frame 101 along the longitudinal direction of the latter. Fastening support 107 further comprises a support plate 110 against which exterior face 6 of covering panel 2 of interior covering device 1 according to the invention comes to press. This support plate 110 has two grooves 111, in which lugs (not visible on the attached Figures) formed or fastened on exterior face 6 of covering panel 2 come to be engaged and wedged.

Each fastening support 107 advantageously further comprises one or more supports for receiving wiring(s) or other systems. These supports are borne by second branch 114 of grip 108. In the illustrated example, two cable supports 112, each able to receive a cable 115, are provided. Each of these cable supports 112 comprises a pin (not visible) fitted into a hole made in second branch 114, which pin thus enables anchoring of cable support 112 in fastening support 107. Each cable support 112 further comprises an articulated collar, which has the shape of a C in open position and comes to hold a cable 115 in closed position.

FIGS. 10 to 16 show an embodiment variant of this invention. In this variant, elements similar to those shown in FIGS. 1 to 9 take on the same references.

In this new embodiment, a covering panel 2 bears, in addition to air pipes 3, also electric cables 115.

FIGS. 10 and 11 illustrate means allowing the fastening of electric cables 115 onto covering panel 2. These means comprise elements associated with covering panel 2 and a cable support 201. Covering panel 2 bears two sectional rails 202 installed parallel one facing the other. Each rail has an L-shaped section and the two sectional rails 202 are turned toward one another.

Cable support 201 has a base plate 203 in which two grooves 204 are made. Each groove is of such shape that a sectional rail 202 can slide inside said groove. Moreover, the two grooves 204 are arranged so that when one sectional rail 202 slides in one groove 204, the other sectional rail 202 slides in the other groove 204. Grooves 204 each have a length corresponding to the length of sectional rails 202. One end of each groove 204 is non-emergent so as to create a stop for corresponding sectional rail 202 at the groove bottom. The two grooves 204 emerge onto the same side of base plate 203. At the emergent end of each groove 204, there is an elastic locking pin 205 which allows a locking of base plate 203 in relation to sectional rail 202 (as illustrated in FIG. 11).

Base plate 203 has two main faces, one face referred to as lower into which each groove 204 emerges, and one face, opposite the lower face, called upper face, and intended to receive electric cables 115. This upper face bears two contacts 206. Each contact 206 has an overall parallelepipedal shape in the upper face of which a V-shaped channel 207 is made, allowing positioning of an electric cable 115. The two channels 207 are parallel, as shown in FIGS. 10 and 11.

Finally, a flexible fastener 208 is provided in order to hold an electric cable 115 positioned in a channel 207. A slot made in contact 206 allows passage of corresponding flexible fastener 208.

Figure 12:
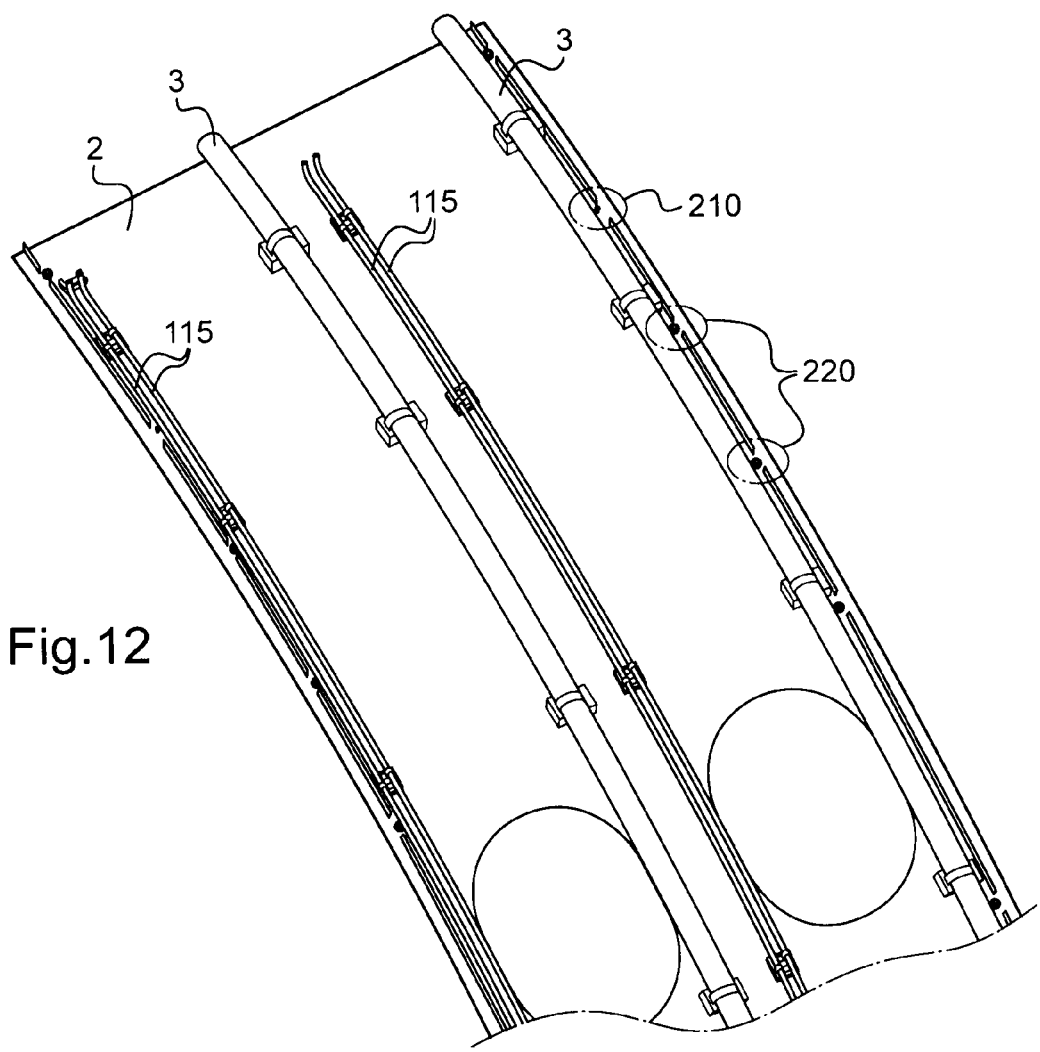
FIG. 12 is a view in perspective of an embodiment variant of an interior covering device.

FIG. 12 shows a covering panel onto which on the one hand air pipes 3 and on the other hand electric cables 115 are fastened. In this embodiment, air pipes 3 extend over the entire length of covering panel 2 and are fastened onto the latter with the aid of fastening means 11 shown in FIG. 6. Electric cables 115 themselves also extend over the entire length of covering panel 2, from one end to the other of same, and are fastened onto this covering panel 2 with the aid of fastening means shown in FIGS. 10 and 11.

FIGS. 13 to 16 show two embodiment variants allowing fastening of covering panel 2 onto frames 101.

Figure 13:
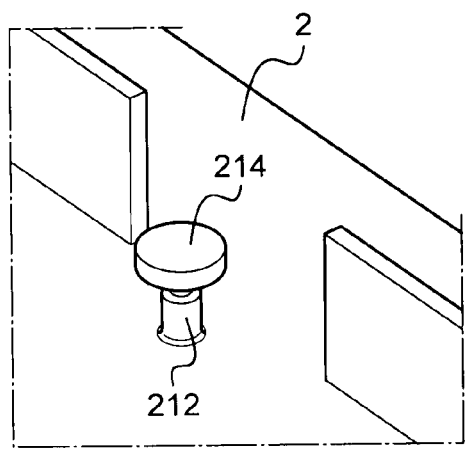
FIG. 13 shows in perspective a detail of the covering of FIG. 12.
Figure 14:
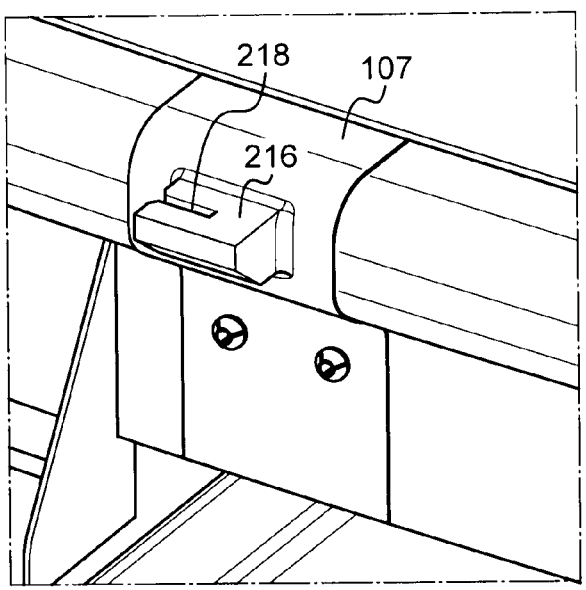
FIG. 14 shows in perspective a fastening support intended to cooperate with complementary means presented in FIG. 13.

FIGS. 13 and 14 illustrate fastening means used, for example, for fastening point 210 (FIG. 12). The fastening means used here comprise, on the one hand, on covering panel 2 a lug with a rod 212 topped by a head 214, and on the other hand, on corresponding frame 101, a fastening support 107 bearing, on the side, a projection 216 in which there is made a groove 218 with a contour adapted for receiving head 214 and its rod 212. It may be provided for example, as shown in FIG. 14, for fastening support 107 to be screwed onto corresponding frame 101.

Figure 15:
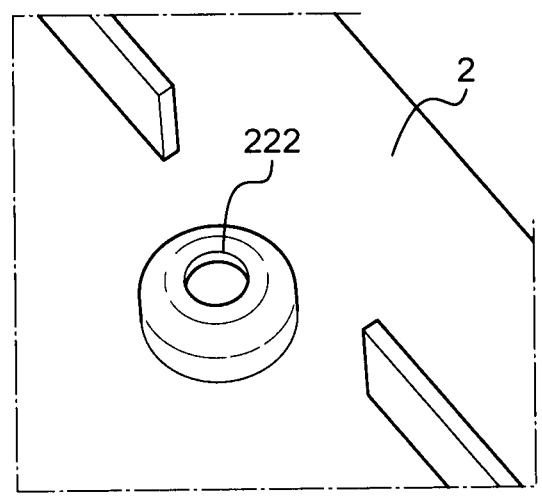
FIG. 15 shows in perspective a detail of the covering of FIG. 14.
Figure 16:
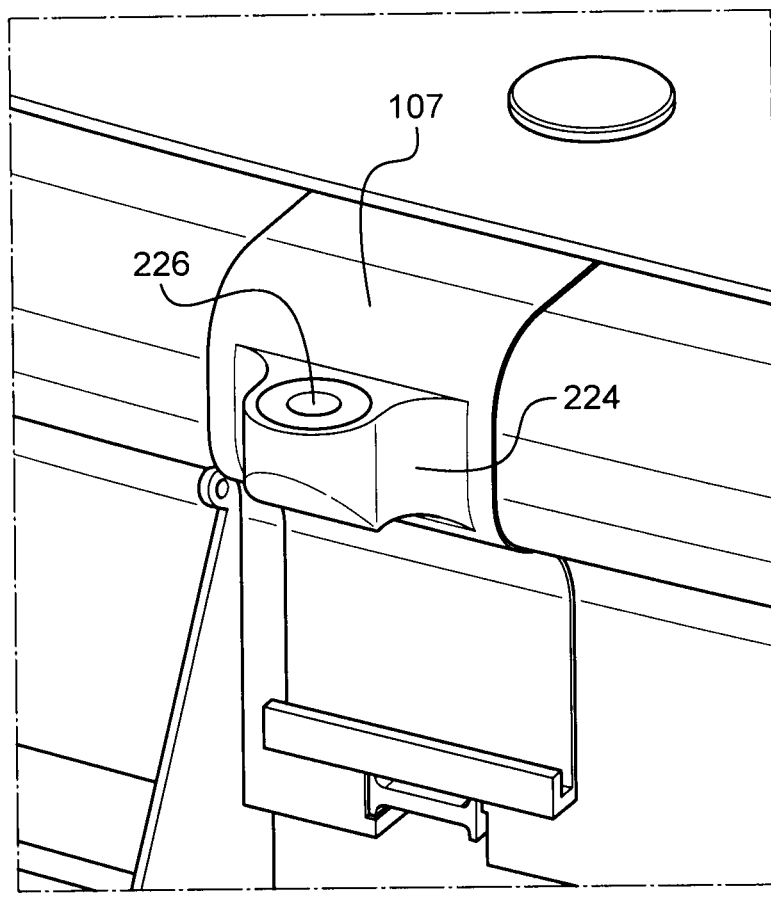
FIG. 16 shows in perspective a fastening support intended to cooperate with complementary means presented in FIG. 15.

As for FIGS. 15 and 16, they show fastening means used, for example, for fastening covering panel 2 to fastening points 220 (FIG. 12). Here it is provided for the covering panel to be screwed onto the fastening support. In this way, as illustrated in FIG. 15, the covering panel has a reinforced hole 222 while the fastening support has a projection 224 having a threaded recess 226.

In the embodiment variants described here, it may be contemplated, as illustrated in FIG. 9, for one or more fastening supports 107 to be used also for supporting electric cables 115. The individual skilled in the art also will know how to adapt these fastening supports 107 so that they can receive, in addition to or in place of cables 115, an air pipe 3 (for reasons of space requirements, it is difficult a priori to provide several air pipes 103 on a single fastening support 107. However, this is not ruled out.)

Installation of an interior covering device 1 according to this invention may be performed, for example, as indicated below. Covering panel 2 of the device is, for example, first of all equipped with air pipes 3 and/or electric cables 115. Each time, between two frames 101, there then comes to be disposed a skin blanket which may be held for example with the aid of hook-and-loop strips better known under the trade name Velcro. Frames 101 themselves also are covered by an insulation blanket called frame blanket. They are held in place on frames 101 with the aid, for example, of fastening supports 107. The connection between the skin blankets and the frame blankets can be accomplished, for example, with the aid of hook-and-loop strips. If systems (air pipes or electric cables or similar) are provided to be installed directly on fastening supports 107, they then are installed. Covering device 1 then is ready to be installed on frames 101 with the aid of fastening means provided on covering panel 2 and fastening supports 107. The various systems connections then are made before and/or during and/or after positioning of covering device 1.

The invention may be subjected to numerous variants in relation to the illustrated embodiments, so long as these variants fall within the context defined by the claims.

For example, the dimensions of the covering panel may correspond to one section of the fuselage (instead of two such as illustrated). In this case, the interior covering device according to the invention preferably integrates only one air pipe.

The means for fastening a covering device according to the invention onto the structure of an aircraft have been described above by way of non-limitative examples. Any other fastening support known or adapted for this invention may be contemplated, if need be with complementary fastening means provided on the covering device, and more particularly on the covering panel.

The invention claimed is:

1. A device for interior covering of an aircraft, the aircraft including a skin fastened onto frames by clips, said device comprising:
   a covering panel bearing at least one air circulation pipe fastened to an exterior face of the covering panel, the covering panel being fastened to fastening supports on the frames,
   wherein the at least one air circulation pipe has an upstream end, equipped with a connection device, and
   wherein the at least one air circulation pipe has a downstream end, opening onto at least one air outlet, said at least one air outlet traversing the covering panel.

2. The device according to claim 1, further comprising at least one support on the covering panel for receiving the at least one air circulation pipe.

3. The device according to one of claim 1 or 2, wherein said at least one air outlet is formed by a nozzle, and
   wherein the downstream end of the at least one air circulation pipe is connected to a corresponding nozzle by a connection device.

4. The device according to claim 1, wherein the upstream end of the at least one air circulation pipe extends projecting from a lower edge of the covering panel.

5. The device according to claim 1, wherein the at least one air circulation pipe is provided with a securing lug which engages in an axial locking support fastened to the exterior face of the covering panel, said securing lug and said axial locking support being adapted for cooperating so as to preclude any movement of the at least one air circulation pipe along an axial direction of said at least one pipe relative to the covering panel.

6. The device according to claim 5, wherein the securing lug has a C-shaped section in a transverse plane of the at least one air circulation pipe and comprises a core having two opposite lateral offshoots extending along the axial direction of said at least one pipe, the axial locking support comprising two facing lateral grooves receiving said offshoots.

7. The device according to claim 5, further comprising, for the at least one air circulation pipe, at least one lateral holding support fastened to the exterior face of the covering panel, the at least one lateral holding support comprising a semicircular face for receiving an air circulation pipe and a clamping collar surrounding said air circulation pipe.

8. The device according to claim 1, wherein the covering panel bears at least one cable support and at least one electric cable installed in said supports.

9. The device according to claim 1, wherein the at least one air circulation pipe is fastened to an exterior face of the covering panel so as to form only one piece with said covering panel.

10. The device according to claim 1, the aircraft further comprising:
- skin blankets covering the skin between two of the frames,
- frame blankets covering the frames, and
- wherein the interior covering device comprises fastening means for fastening of said covering device onto fastening supports, each fastening support fastened onto a frame, and for holding the corresponding frame blanket on said frame, at least locally.

11. The device according to claim 1, wherein the exterior face of the covering panel is convex.

* * * * *